United States Patent [19]
Beckwith et al.

[11] Patent Number: 5,950,995
[45] Date of Patent: Sep. 14, 1999

[54] RING LASER GYROSCOPE DITHER MOTOR STRUCTURE

[75] Inventors: Timothy A. Beckwith, Coon Rapids; William M. Brintz, Lino Lakes; Karl D. Johnson, St. Paul, all of Minn.

[73] Assignee: Honeywell Inc., Minneapolis, Minn.

[21] Appl. No.: 08/984,773

[22] Filed: Dec. 4, 1997

[51] Int. Cl.$^6$ .................................................. G01C 19/70
[52] U.S. Cl. ............................ 267/161; 256/350; 310/48
[58] Field of Search .................... 267/159–161; 310/311, 348; 356/350; 372/94

[56] References Cited

U.S. PATENT DOCUMENTS

| | | | |
|---|---|---|---|
| 3,107,766 | 10/1963 | Pritchard | 267/160 |
| 3,259,383 | 7/1966 | Johnson et al. | 267/161 |
| 3,750,251 | 8/1973 | Dugh et al. | 267/161 |
| 3,807,029 | 4/1974 | Troeger | 267/160 |
| 4,314,174 | 2/1982 | Wing et al. . | |
| 4,349,183 | 9/1982 | Wirt et al. | 267/160 |
| 4,370,583 | 1/1983 | Ljung . | |
| 4,436,423 | 3/1984 | Kumar et al. . | |
| 4,740,084 | 4/1988 | Curby et al. . | |
| 4,801,206 | 1/1989 | Benoist . | |
| 4,847,855 | 7/1989 | Derry et al. . | |
| 4,988,908 | 1/1991 | Langton . | |
| 5,063,321 | 11/1991 | Carter | 310/323 |
| 5,108,180 | 4/1992 | Simms et al. . | |
| 5,308,575 | 5/1994 | Ford . | |
| 5,867,270 | 2/1999 | Beckwith et al. | 356/350 |

*Primary Examiner*—Chris Schwartz
*Attorney, Agent, or Firm*—Albert K. Kau

[57] ABSTRACT

Disclosed is a dither spring structure and method of dither spring manufacture. The dither spring structure includes a central hub, an outer toroidal rim, a plurality of flexible reeds and a plurality of lobes. The reeds extend between the hub and the rim, and one of the lobes is positioned between each pair of adjacent reeds. The rim is defined by a plurality of spaced arcuate segments with one of the segments at a radial outward end of each of the reeds. Each arcuate segment has first and second wing elements extending transversely to each side of its respective reed, and a free end of the first wing element of one reed is spaced from a free end of the second wing element of an adjacent reed to produce thermal stress relief. The dither spring structure can be manufactured via electro-discharge machining (EDM) using a single continuous pass of an EDM cutting element.

11 Claims, 3 Drawing Sheets

RING LASER GYROSCOPE DITHER MOTOR STRUCTURE

BACKGROUND OF THE INVENTION

This invention relates to inertial instrument sensors. In particular, the present invention is a ring laser gyroscope dither spring structure and method of manufacture of a dither spring that minimizes thermally induced stress effects on the ring laser gyroscope block.

A ring laser gyroscope (RLG) is commonly used to measure the angular rotation of a vehicle, such as an aircraft. Such a gyroscope has two counter-rotating laser light beams which move within a closed loop optical path or "ring" with the aid of successive reflections from multiple mirrors. The closed path is defined by an optical cavity which is interior to a gyroscope frame or "block". In one type of RLG, the block includes planar top and bottom surfaces that are bordered by six planar sides that form a hexagon shaped perimeter. Three planar non-adjacent sides of the block form the mirror mounting surfaces for three mirrors at the corners of the optical path which is triangular in shape.

Operationally, upon rotation of the RLG about its input axis (which is perpendicular to and at the center of the planar top and bottom surfaces of the block), the effective path length of each counter-rotating laser light beam changes and a frequency differential is produced between the beams that is nominally proportional to angular rate. This differential is then measured by signal processing electronics to determine the angular rotation of the vehicle.

Because of backscatter radiation, which is created as the laser light beams are reflected at the mirror surfaces, and other factors, the frequency difference between the counter-rotating laser light beams disappears when the angular velocity of the RLG about its input axis has a value that is below a particular threshold. This phenomenon is called "lock-in", and the range of angular rotation over which lock-in occurs is the "deadband" of the RLG. This phenomenon is undesirable because, at low rotation rates, lock-in produces an indication that no rotation is occurring when in fact, there is low rate angular rotation. Therefore, any inability to accurately measure low angular rotation rates reduces the effectiveness of the RLG in vehicle navigation systems.

There are several known approaches to eliminating the lock-in phenomenon. One such approach involves using a drive motor for mechanically oscillating the RLG about its input axis so that the RLG is constantly sweeping through the deadband and is never locked therein. This mechanical oscillation of the RLG is called dithering. Dithering is accomplished by mounting gyroscope block on a flexure device known as a "dither spring".

One such known dither spring 10 for dithering a gyroscope block 12 of a RLG 14 is illustrated in FIG. 1. The dither spring 10 is generally composed of a central member or hub 16 (which is centered on the input axis 18 of the RLG 14) having a plurality of flexible radial members or reeds 20 extending between the hub 16 and a continuous toroidal rim 22. Triangular shaped lobes 24 extend outwardly from the hub 16, and one of the lobes 24 is interposed between each pair of adjacent reeds 20. Each lobe 24 has a fastener aperture 26 for appropriate fasteners, such as bolts (not shown), to fasten and secure the dither spring 10 to an appropriate gyro support or inertial platform (not shown). The toroidal rim 22 is defined by arcuately spaced mounting sections 28 through which the dither spring 10 is secured within the block bore 30 of the gyroscope block 12 by a suitable adhesive. The mounting sections 28 are arcuately spaced by way of rim notches 32 located at the ends of the reeds 20. Each reed has a pair of piezoelectric transducers (PZT's) 34 mounted on opposite sides thereof via a suitable adhesive. The combination of the dither spring 10 and PZT's 34 defines drive motor 11 for mechanically oscillating the RLG 14 about its input axis 18.

Voltages are applied to the PZT's 34 such that one PZT on each reed 20 increases in length while the other PZT decreases in length. The effect of these length changes in the PZT's 34 is transmitted to the reeds 20 through the mounting of the PZT's 34 thereon. Increasing the length of one side of each reed 20 while shortening the other side causes the reeds 20 to flex or bend so that each reed 20 experiences a small rotation about the RLG input axis 18. The voltage is oscillatory so that the reeds 20 are constantly vibrating in phase and the gyroscope block 12 mounted to the toroidal rim 22 rotates about the input axis 18. The amplitude of the dithering is generally carefully controlled and monitored to minimize the effects of lock-in. Since the dither oscillation angular velocity and displacement can be constantly monitored, they can be excluded from the output signal of the RLG 14.

Though the above described, known dither spring 10 adequately dithers the gyroscope block 12 of a RLG 14 so as to prevent lock-in, there are some disadvantages. Currently, the dither spring 10 illustrated in FIG. 1, is machined to shape from a dither spring "blank" via a process known as electro-discharge machining (EDM). EDM removes material through the use of an electric spark generated by a high energy power supply. To form the known dither spring 10 of FIG. 1, requires that the dither spring "blank" be first drilled to form a central locating aperture (which also defines the RLG input axis 18) for the EDM cutting element. Next, the three, lobe fastener apertures 26 are drilled. Subsequently, an EDM cutting element is setup three times to remove material from the "blank" (see reference numerals 36, 38 and 40) to form the three lobes 24 and three reeds 20 of the dither spring 10. Finally, the EDM cutting element is setup a fourth time to remove material from the blank (see reference numeral 42) to form the outer periphery of the toroidal rim 22. Due to the multiple drilling steps and multiple EDM cutting element setups required to machine the dither spring 10 to final form, the known dither spring structure shown in FIG. 1, is costly and time consuming to manufacture.

In addition to the dither spring manufacturing disadvantages described above, a RLG incorporating the known dither spring 10 shown in FIG. I is sensitive to temperature changes because of the different rates of thermal expansion and contraction of the gyroscope block 12 and the dither spring 10 (due to the differences in the coefficients of thermal expansion (CTE's) of the materials from which the block 12 and dither spring 10 are manufactured). In practice, though the block 12 is generally temperature stable, the dither spring 10 experiences thermally induced dimensional changes. These dither spring dimensional changes are transferred to the block 12 via the block bore 30 imparting mechanical stress to the block 12, thereby degrading the accuracy of the angular rotation data output of the RLG 14 and the lifetime expectancy of the dither spring 10 and the RLG 14. Though voids 44 (see FIG. 1) between the toroidal rim 22 and the block bore 30 (created by the rim notches 32) allow substantially stress free, radial length expansion and contraction of the reeds 20 due to temperature changes, the known dither spring 10, does not readily permit stress free circumferential expansion and contraction length changes of the rim 22 under temperature changes.

Hence, there is a need for an improved dither spring structure and method of dither spring manufacture. In particular, there is a need for a RLG dither spring structure that can expand and contract under temperature changes while minimizing the mechanical stress imparted to the gyroscope block of the RLG. In addition there is a need for a dither spring structure that is less costly and time consuming to manufacture.

SUMMARY OF THE INVENTION

The present invention is a ring laser gyroscope dither spring structure and method of dither spring manufacture. The dither spring includes a central hub, a plurality of triangular shaped lobes, a plurality of flexible radial reeds and an outer toroidal rim. The plurality of triangular shaped lobes extend radially outward from the central hub and are used to mount the dither spring to an inertial platform. The plurality of flexible reeds extend radially outward from the central hub, with one of the plurality of reeds positioned between each pair of adjacent lobes. The outer toroidal rim is used to mount the dither spring to a gyroscope block of a ring laser gyroscope. The toroidal rim is defined by a plurality of spaced arcuate segments with one of the plurality of segments at a radial outward end of each of the reeds. Each arcuate segment has first and second wing elements extending opposite and transversely to each side of its respective reed. A free end of the first wing element of one reed is spaced from a free end of the second wing element of an adjacent reed to produce thermal stress relief. The method of dither spring manufacture entails providing a material blank, and removing material from the material blank in one continuous pass to form the above described dither spring structure.

This dither spring structure and method of dither spring manufacture is less costly and time consuming, since this dither spring can be formed in one continuous pass of a cutting element as compared to the multiple setups and passes of the cutting element required for the known dither spring structure. In addition, the spacing of the free end of the first wing element of one reed from the free end of the second wing element of an adjacent reed permits circumferential length expansion and contraction of the toroidal rim under temperature changes while minimizing the mechanical stress imparted to a gyroscope block of a ring laser gyroscope.

DETAILED DESCRIPTION OF THE PREFERRED EMBODIMENT

Figure 2:
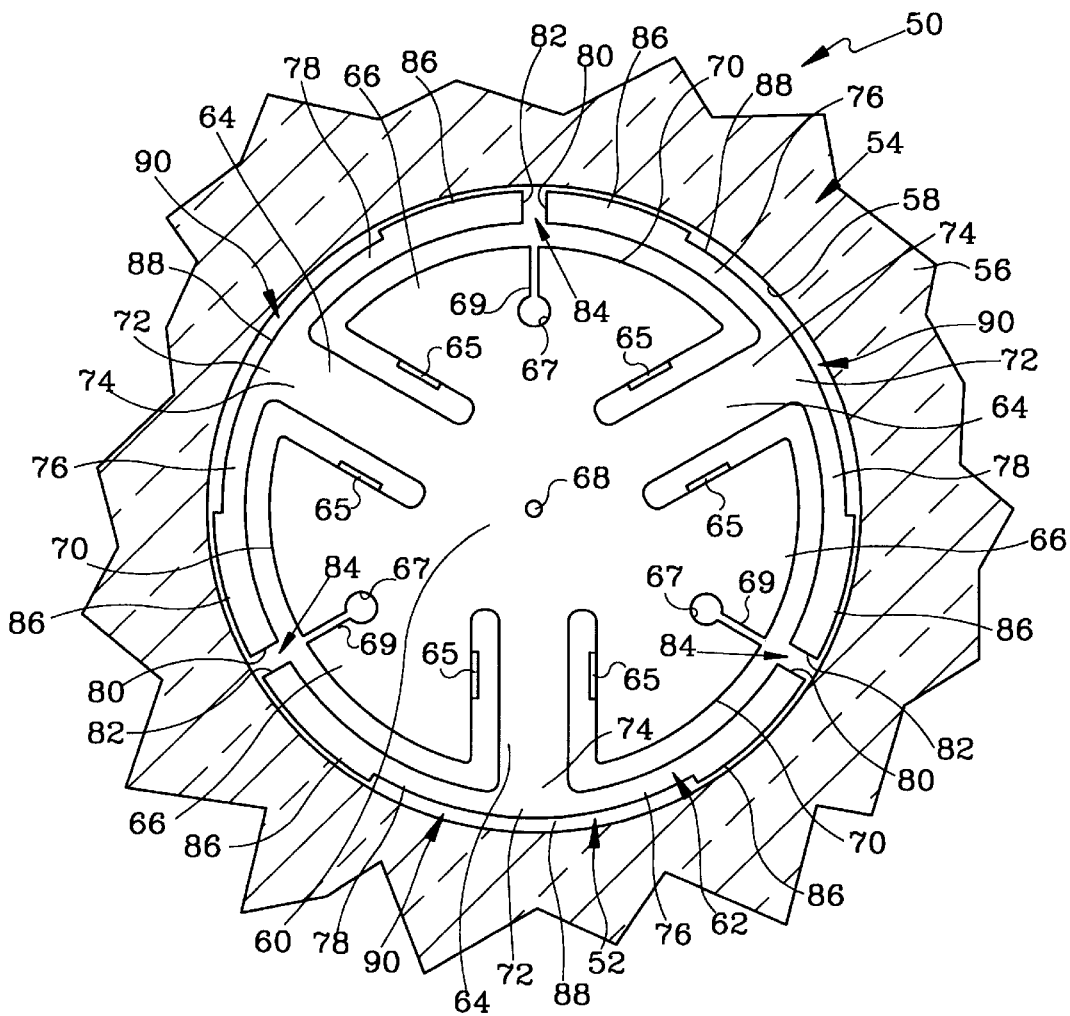
FIG. 2 is an elevational view of a dither spring structure for a RLG in accordance with the present invention.
Figure 3:
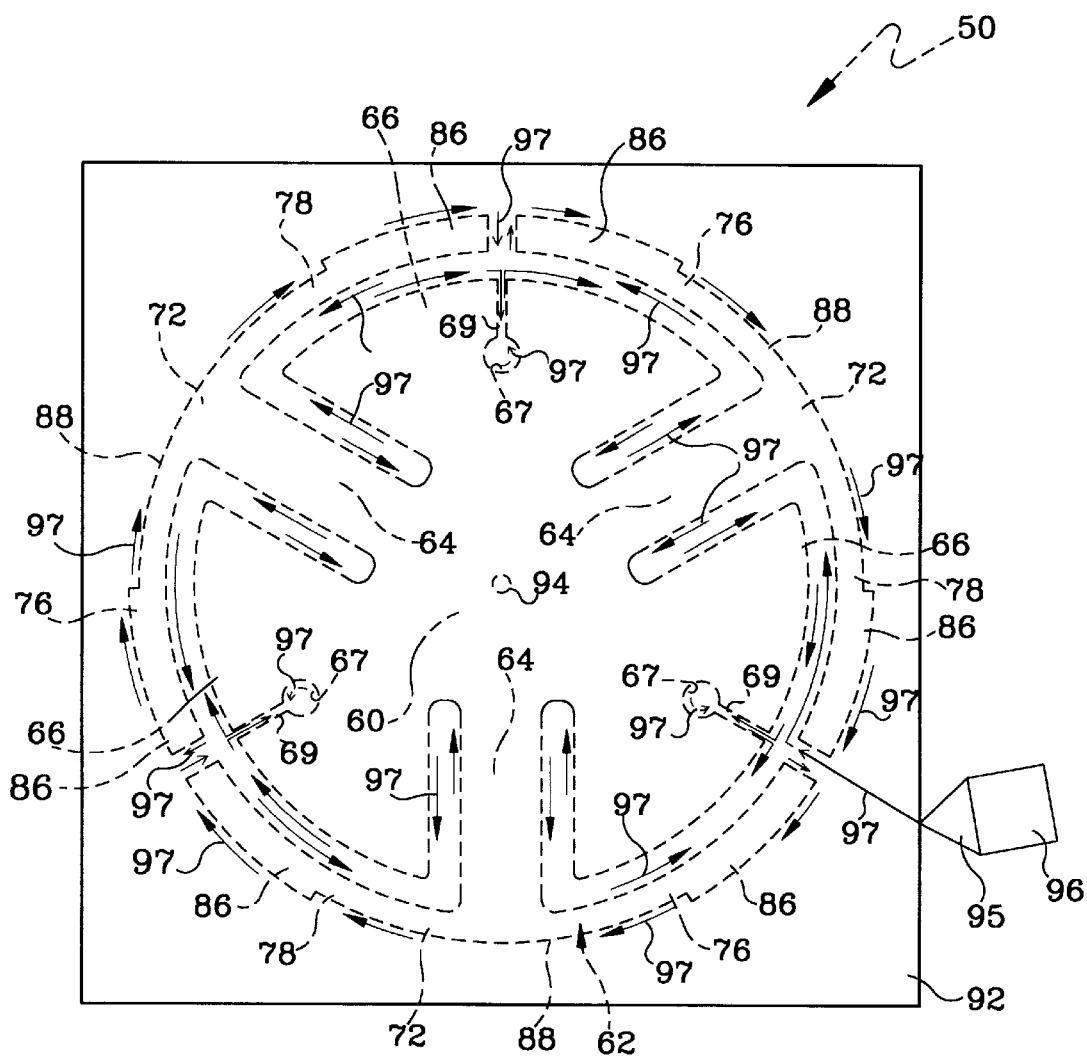
FIG. 3 is an elevational view illustrating a method of manufacturing the dither spring structure of FIG. 2 in accordance with the present invention.

A dither spring structure 50 and method of dither spring manufacture in accordance with the present invention is illustrated in FIGS. 2 and 3. The dither spring 50 forms part of a drive motor 52 for dithering a ring laser gyroscope (RLG) 54 (only partially shown). The RLG 54 includes a gyroscope block 56 having a centrally located block bore 58 sized to receive the dither spring 50. The block 56 is formed of a glass ceramic or like material. Suitable gyroscope block materials include glass ceramic materials marketed under the trademarks "Cervit" and "Zerodur". These materials are generally temperature stable and typically have a coefficient of thermal expansion (CTE) of approximately 0.05E-06/° C.

The dither spring 50 of the drive motor 52 includes a central hub 60, an outer toroidal rim 62, three flexible reeds 64, and three triangular shaped lobes 66. The lobes 66 extend radially outward from the central hub 60. Each of the lobes 66 includes a fastener aperture 67 for receiving an appropriate fastener, such as bolts (not shown), for mounting and securing the dither spring 50 to an appropriate gyro support or inertial platform (not shown). Each of the lobes 66 further includes a slit 69 that extends radially, through the material of the lobe 66, from the fastener aperture 67 to an outer sidewall surface 70 of the lobe 66. The reeds 64 extend radially outward from the central hub 60 to the toroidal rim 62. One of the reeds 64 is interposed between each pair of adjacent lobes 66. A pair of piezoelectric transducers (PZT's) 65 of the drive motor 52 are mounted on opposite sides of the reeds 64 via a suitable adhesive. Applying a voltage to the PZT's 65 causes the flexible reeds 64 to bend which rotates the rim 62 relative to the hub 60 (which is centered on an input axis 68 of the RLG 54) thereby dithering the RLG 54.

As seen FIG. 2, the outer toroidal rim 62 is defined by three spaced arcuate segments 72. One of the arcuate segments 72 is located at a radial outward end 74 of each of the reeds 64. Each of the arcuate segments 72 is further defined by first and second, oppositely directed, wing elements 76 and 78, respectively. The first and second wing elements 76 and 78 extend transversely from each side of their respective reed 64, such that, a free end 80 of the first wing element 76 of one reed of the reeds 64 is spaced from a free end 82 of the second wing element 78 of an adjacent reed of the reeds 64. The spaced free ends 80 and 82 of the first and second wing elements 76 and 78 of adjacent reeds 64 define a first set of three thermal stress relief voids 84. The first thermal stress relief voids 84 are in radial alignment with the slits 69 of the lobes 66.

The free ends 80 and 82 of the first and second wing elements 76 and 78 of each of the arcuate segments 72 include mounting sections 86 which are arcuately separated by rim notches 88. The dither spring 50 is mounted to the block bore 58 of the gyroscope block 56 of the RLG 54 at the mounting sections 86 via a suitable adhesive. The rim notches 88 define areas of non-contact between the arcuate segments 72 and the block bore 58. These areas of non-contact define a second set of three thermal stress relief voids 90. In one preferred embodiment, the dither spring 50 is made of super invar having a CTE of 0.5E-06/° C.

Due to the dissimilarities of the coefficients of thermal expansion of the materials from which the gyroscope block 56 and the dither spring 50 are manufactured, the dither spring 50 and gyroscope block 56 expand and contract at different rates upon changes in temperature. However, the first thermal stress relief voids 84 permit circumferential length changes of the arcuate segments 72 upon expansion and contraction of the toroidal rim 62 under temperature changes. During thermal expansion or contraction of the rim 62, the free ends 80 and 82, of the first and second wing elements 76 and 78 of adjacent reeds 64, will displace into and out of the first voids 84 and will not touch or abut one another, thereby producing thermal stress relief. Likewise, the second thermal stress relief voids 90 permit radial length changes of the reeds 64 upon expansion and contraction of the reeds 64 under temperature changes. During thermal expansion or contraction of the reeds 64, the rim notches 88 will displace into and out of the second voids 90 and will not touch or abut the block bore 58, thereby producing thermal stress relief The thermal stress relief provided by the first and second voids 84 and 90 minimizes the mechanical stress imparted to the gyroscope block 56 by the dither spring 50 upon thermally induced dimensional changes.

Figure 1:
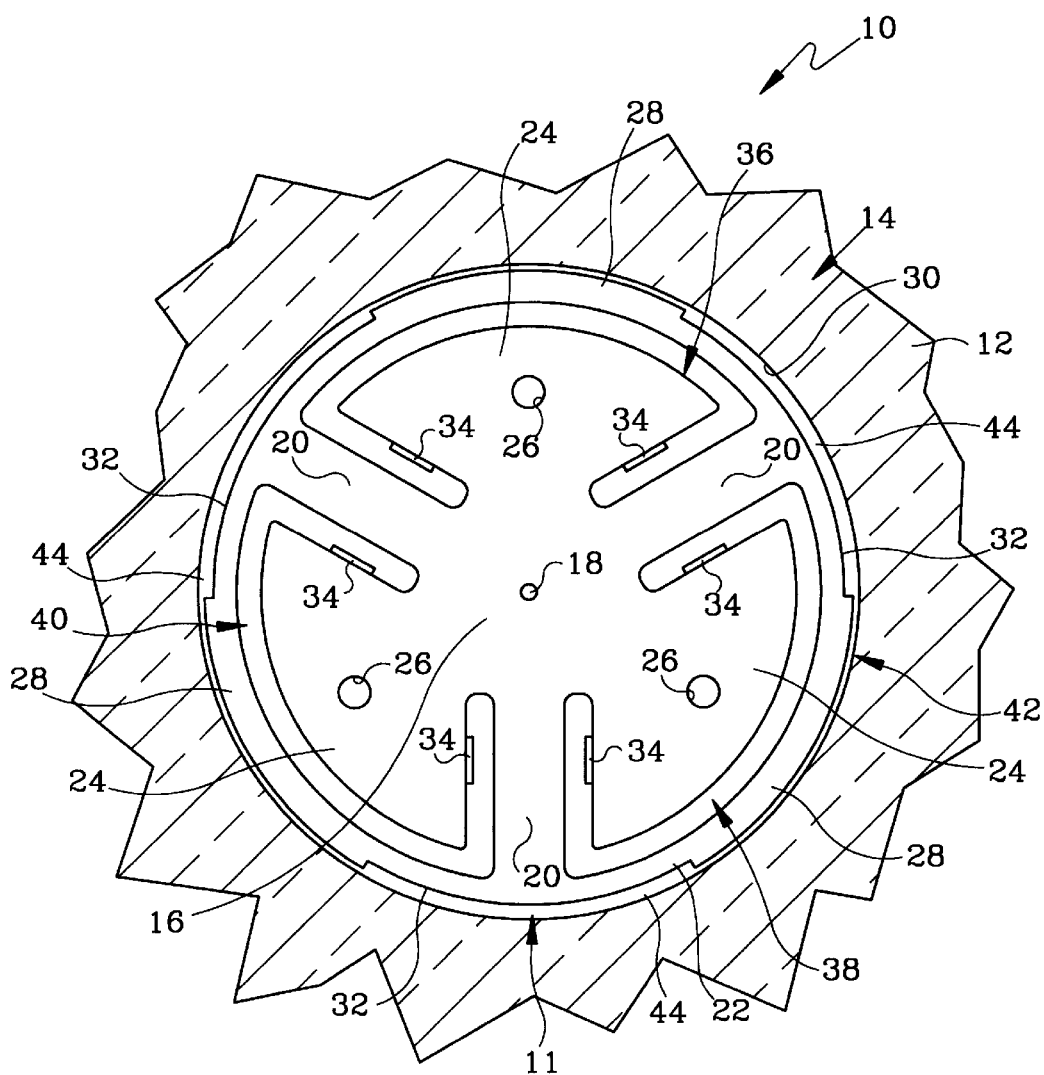
FIG. 1 is an elevational view of a known dither spring structure for a ring laser gyroscope (RLG).

As seen best in FIG. 3, the dither spring structure 50 is machined to the above described shape from a dither spring material "blank" 92 via electro-discharge machining (EDM). The method of manufacturing the dither spring structure 50 in accordance with the present invention begins with the drilling of a central locating aperture 94 (which coincides with the input axis 68 of the RLG 54) in the dither spring material blank 92. Next, a cutting element 95 of an EDM device 96 is used to remove material from the blank 92, thereby machining the blank 92 to the dither spring structure 50 as described above. The cutting element 95 of the EDM device 96 is setup only once, and makes a single continuous pass (as represented by the path arrow 97) to machine the dither spring 50 from start to finish. This single pass machining operation is accomplished mainly due to the slits 69 and voids 84 (see FIG. 2) of the dither spring structure design. The dither spring structure 50 is less costly and time consuming to manufacture since this dither spring 50 can be formed in one continuous pass of the cutting element 95 as compared to the multiple setups and passes of the cutting element required for the known dither spring structure 10 of FIG. 1.

Although the present invention has been described with reference to preferred embodiments, workers skilled in the art will recognize that changes may be made in form and detail without departing from the spirit and scope of the invention.

We claim:

1. A dither spring for a ring laser gyroscope, comprising:
   a central hub;
   a plurality of triangular shaped lobes extending radially outward from the central hub for mounting the dither spring to an inertial platform;
   a plurality of flexible radial reeds extending radially outward from the central hub, wherein one of the plurality of reeds is positioned between each pair of adjacent lobes; and
   an outer toroidal rim for mounting the dither spring to a gyroscope block of a ring laser gyroscope, the rim being defined by a plurality of spaced arcuate segments with one of the plurality of segments at a radial outward end of each of the reeds, wherein each arcuate segment has first and second wing elements extending opposite and transversely to each side of its respective reed, with a free end of the first wing element of one reed being spaced from a free end of the second wing element of an adjacent reed to produce thermal stress relief.

2. The dither spring of claim 1 wherein the free ends of the first and second wing elements of each arcuate segment of each reed has a mounting section at which the dither spring adapted to be is secured to a block bore of ring laser gyroscope block.

3. The dither spring of claim 2 wherein the mounting sections of the first and second wing elements of each arcuate segment of each reed are arcuately separated by a rim notch that defines an area of non-contact between the arcuate segments and block bore to produce thermal stress relief.

4. The dither spring of claim 3 wherein each lobe of the plurality of triangular shaped lobes includes a fastener aperture for receiving a fastener for mounting the dither spring to an inertial platform.

5. The dither spring of claim 4 wherein each lobe of the plurality of triangular shaped lobes includes a slit extending radially from the fastener aperture to an outer surface of the lobe.

6. The dither spring of claim 5 wherein the radially extending slits of the lobes are in alignment with the spaces between the free ends of the first and second wing elements of adjacent reeds.

7. The dither spring of claim 1 wherein the flexibility of the reeds allows the arcuate segments of the toroidal rim to rotate relative to the hub.

8. A method of manufacturing a dither spring for a ring laser gyroscope, the method comprising the steps of:
   providing a material blank; and
   removing material from the material blank in one continuous pass to form a dither spring having a central hub, a plurality of triangular shaped lobes extending radially outward from the central hub, a plurality of flexible reeds extending radially outward from the central hub with one of the plurality of reeds positioned between each pair of adjacent lobes, and an outer toroidal rim defined by a plurality of spaced arcuate segments with one of the plurality of segments at a radial outward end of each of the reeds, wherein each segment has first and second wing elements extending opposite and transversely to each side of its respective reed, with a free end of the first wing element of one reed being spaced from a free end of the second wing element of an adjacent.

9. The method of claim 8 wherein the step of removing material from the material blank in one continuous pass to form the dither spring includes:
   removing material from each of the plurality of triangular shaped lobes to form a fastener aperture having a slit that extends radially from the fastener aperture to an outer surface of the lobe.

10. The method of claim 8 wherein the step of removing material from the material blank in one continuous pass to form the dither spring includes the step of:
    machining material from the material blank in one continuous pass to form the dither spring.

11. The method of claim 10 wherein the step of machining material from the material blank in one continuous pass to form the dither spring is accomplished using electro-discharge machining.

* * * * *

UNITED STATES PATENT AND TRADEMARK OFFICE
CERTIFICATE OF CORRECTION

PATENT NO. : 5,950,995

DATED : September 14, 1999

INVENTOR(S) :
Thomas A. Beckwith, William M. Brintz, Karl D. Johnson

It is certified that error appears in the above-identified patent and that said Letters Patent is hereby corrected as shown below:

In the Claims, line 58, column 5, replace "adapted to be is" with --is adapted to be--

Signed and Sealed this

Eleventh Day of April, 2000

Q. TODD DICKINSON

*Attest:*

*Attesting Officer*        *Director of Patents and Trademarks*